United States Patent [19]
Smith et al.

[11] 4,102,942
[45] Jul. 25, 1978

[54] COMPOSITIONS OF HIGH SOLIDS CONTENT COMPRISING CARBOXYLIC POLYMER AND ALIPHATIC DIEPOXIDE

[75] Inventors: Oliver Wendell Smith, South Charleston; Robert Arthur Taller; Joseph Victor Koleske, both of Charleston, all of W. Va.

[73] Assignee: Union Carbide Corporation, New York, N.Y.

[21] Appl. No.: 709,816

[22] Filed: Jul. 29, 1976

[51] Int. Cl.² ................. C08G 59/42; C08L 63/10
[52] U.S. Cl. .................... 260/836; 260/31.4 EP; 260/31.4 R; 260/32.8 EP; 260/32.8 R; 260/42.28; 260/42.52; 260/42.54; 428/413; 428/418; 428/461; 428/463; 428/500; 526/55; 528/366
[58] Field of Search ............ 260/78.3 R, 78.41, 836, 260/78.3 UA; 526/11.2

[56] References Cited

U.S. PATENT DOCUMENTS

| 2,604,457 | 7/1952 | SeGall et al. | 260/2 EA |
|---|---|---|---|
| 2,890,194 | 6/1959 | Phillips et al. | 260/78.3 X |
| 2,890,197 | 6/1959 | Phillips et al. | 260/2 EA X |
| 3,027,357 | 3/1962 | Stickle | 260/78.3 R |
| 3,321,424 | 5/1967 | Imes et al. | 526/11.2 X |
| 3,514,419 | 5/1970 | Darlow et al. | 526/11.2 X |
| 3,843,612 | 10/1974 | Vogel et al. | 526/11.2 |

FOREIGN PATENT DOCUMENTS 881,981  5/1943  France.

Primary Examiner—Howard E. Schain
Attorney, Agent, or Firm—Francis M. Fazio

[57] ABSTRACT

High solids coating or ink compositions comprising blends of low molecular weight acrylic copolymers having pendant carboxyl groups and aliphatic polyepoxides.

7 Claims, No Drawings

COMPOSITIONS OF HIGH SOLIDS CONTENT COMPRISING CARBOXYLIC POLYMER AND ALIPHATIC DIEPOXIDE

BACKGROUND OF THE INVENTION

Governmental regulations have placed ever increasing restrictions on the amounts and types of organic volatiles permitted to escape into the atmosphere from coatings compositions. Considerable efforts have been expended to develop coatings compositions having a minimal amount of volatile organic components and this has led to development of powder coatings, radiation-curable coatings, water-borne coatings, and high solids coatings. In these recent developments, the amounts of organic solvents present are minimal and consequently there is little or no atmospheric pollution.

In the field of solvent coatings, efforts have been made to reduce the amount of volatile solvent present and to increase the amount of component that will remain as the coatings on the substrate. At a sufficiently high concentration of such components, one has what is known as a high solids coating composition. These are compositions that are applied in liquid form and dry to acceptable films without the evaporation of substantial quantities of solvents. Thus, a high solids coating composition, such as the ones hereinafter described, which would serve to lower atmospheric pollution and still produce a good satisfactory coating composition, would be of great importance.

SUMMARY OF THE INVENTION

It has now been found that certain low molecular weight acrylic copolymers containing a pendant carboxyl group can be used in conjunction with certain aliphatic polyepoxides, particularly cycloaliphatic epoxides, to produce high solids compositions useful as inks and coatings that can be cured rapidly and efficiently and are considered low-energy curable. The acrylic polymers are hereinafter more fully described and are the reaction product of a carboxylic acid such as acrylic acid or methacrylic acid and acrylic monomers other than the said acids, which monomers impart low glass transition temperatures to the polymers produced. The compositions can optionally contain catalysts, organic polyisocyanates, and solvents. They are applied in a conventional manner and thermally cured to dry films.

DESCRIPTION OF THE INVENTION

The low molecular weight carboxylic-containing acrylic polymers that are blended with the aliphatic polyepoxides to produce the coating compositions of this invention are produced by the copolymerization of a mixture of a carboxyl-containing monomer and an ethylenically unsaturated compound in such proportions as to obtain a copolymer with a glass transition temperature below room temperature and an average number molecular weight of from about 500 to 10,000. The carboxyl group containing monomer is present in the copolymer at a concentration of from about 15 weight percent to as high as 60 weight percent.

The carboxyl group containing monomer used to produce the low molecular weight acrylic copolymers can contain one or two carboxyl groups. These monomers are defined by the structural formula

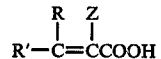

wherein Z is hydrogen, methyl or carboxymethyl; R is H or methyl; and R' is hydrogen or carboxyl.

Illustrative of preferred carboxylic-containing monomers are acrylic acid, methacrylic acid, maleic acid, itaconic acid, and citraconic acid.

The ethylenically unsaturated monomers employed to form the copolymers are preferably those whose homopolymers have a glass transition below 0° C. Also included would be mixtures of monomers that produce copolymers whose glass transition temperatures are below 0° C, although one or more of the monomers present may form homopolymers with glass transition temperatures above 0° C. Illustrative of suitable acrylic monomers are 2-ethylhexyl acrylate, butyl acrylate, 2-ethylhexyl methacrylate, lauryl acrylate, lauryl methacrylate, and isodecyl acrylate. These monomers are normally present in the final copolymer at a concentration of from about 30 percent by weight to 80 percent by weight.

One can also have present in the copolymer a minor concentration of modifying monomer. When used, the modifying monomer is present in the copolymer at from about 0% by weight to no more than 40 percent by weight. Illustrative of suitable modifying monomers one can mention styrene, alphamethyl styrene, acrylonitrile, methacrylonitrile, methyl methacrylate, and vinyl chloride. Thus, when ethylenically unsaturated monomers are used with the carboxylic acid monomers to form the copolymers, the carboxylic acid monomer is present in the copolymer at from about 15% by weight to about 60% by weight, the modifying monomer is present from about 0% by weight to no more than 40% by weight, and the ethylenically unsaturated monomer is present at from about 30% by weight to about 80% by weight.

The copolymers of the carboxylic acid monomers are prepared by a variety of known methods. Generally, a free radical initiator is used to induce polymerization. Some of the free radical initiators known in the art include benzoyl peroxide, lauryl peroxide, t-butyl hydroperoxide, acetyl cyclohexane sulfonyl peroxide, diisobutyl peroxide, t-butyl peroxybenzoate, diisopropyl peroxydicarbonate, azobis(2-methylpropionitrile), etc. The polymerization is preferably carried out in solution using a solvent in which the copolymer is soluble. Butyl acetate, 2-ethoxyethyl acetate, 2-ethoxyethanol, isopropanol, dioxane, etc., are suitable solvents for conducting the polymerization. In some instance the solvent may not be needed.

The carboxylic acid copolymers can also be prepared by any of the known emulsion polymerization, suspension polymerization, or bulk polymerization processes. Chain transfer agents and solvents can also be used to control the molecular weight of the copolymer to the desired range.

The low-energy-curable, high solids compositions of this invention comprise mixtures of (1) the carboxyl-containing acrylic polymer, (2) aliphatic polyepoxide, and (3) suitable additives such as flow control agents, pigments, UV stabilizer, and any of the other additives that are known to those skilled in the art of coating and ink formulations.

The aliphatic polyepoxides that can be used in producing the compositions of this invention are well known to those skilled in the art and are described in U.S. Pat. No. 3,027,357, U.S. Pat. No. 2,890,194, and U.S. Pat. No. 2,890,197. Of particular interest is that portion of U.S. Pat. No. 3,027,357 beginning at column 4, line 11, to column 7, line 38, which portion and disclosure is specifically incorporated herein by reference. Among some of the specific illustrative diepoxides disclosed therein one can mention 3,4-epoxycyclohexylmethyl-3,4-epoxycyclohexane carboxylate, bis(3,4-epoxy-6-methylcyclohexyl-methyl) adipate, bis(2,3-epoxycyclopentyl) ether, vinyl cyclohexane dioxide, 2-(3,4-epoxycyclohexyl)-5,5-spiro(2,3-epoxycyclohexane)-m-dioxane, bis(3,4-epoxycyclohexylmethyl)adipate, and the like.

The concentration of the carboxyl-containing low molecular weight acrylic copolymer described above in the coating and ink compositions of this invention can vary from 10 to 60 weight percent, preferably from 30 to 50 weight percent, based on the combined weight of said carboxyl-containing acrylic polymer and polyepoxide. Therefore, the corresponding concentration of polyepoxide in the composition (on the same basis) is from 40 to 90 percent by weight, preferably from 50 to 70 percent by weight.

There can also be present in the blended composition of this invention a catalyst for the reaction of the oxirane group of the polyepoxide with the pendant carboxyl group of the copolymer. The catalysts are used in the conventional catalysts known to those skilled in the art. Any of the known catalysts can be used; and illustrative thereof one can mention stannous octoate, benzyldimethylamine, tris(dimethylaminomethyl)phenol, triethylenediamine, tributylphosphine, triethylamine, uranyl nitrate hexahydrate, zinc oxide, and the like.

The high solids curable compositions of this invention can also contain a minor amount of solvent to assist in viscosity control. In such instances any of the known organic solvents can be employed that are conventionally used in the coating and ink fields.

In addition, other crosslinkers can also be present in small amounts, such as urea formaldehyde resins, melamine formaldehyde resins, or polyisocyanates. In such instances, one can include a known catalyst pertinent for crosslinking this selected second crosslinker.

In the absence of any catalyst in the high solids compositions of this invention, the potlife of the composition can be as much as 10 hours or more. The presence of a catalyst tends to hasten the cure reaction, even at ambient temperature, and generally reduces the potlife to up to about 5 hours. It was observed, however, that the presence of a tertiary amine in an amount in excess of the equivalent amount of catalyst present for the reaction between the carboxyl and oxirane groups, served to extend the potlife of the compositions of this invention, in some instances to as long as two days when stannous octoate is the catalyst.

In view of the potlives of the compositions, it is preferred to prepare the desired blend of acrylic polymer derivatives and polyepoxide of this invention as it is needed. This is a common and accepted procedure in commercial practice today when reactive components are involved. The blends are produced by any of the known and practiced mixing procedures used by the ink and coating compositions industry. These procedures require no further description herein to enable one skilled in the art to produce our novel compositions.

The high solids compositions of this invention can also contain colorants, pigments, dyes, fillers, fungicides, bactericides, and other additives conventionally added to coating and ink compositions in their usual concentrations.

The coating compositions are applied to a substrate by the known conventional methods. They are cured by heating at a temperature of about 125° to 350° F., preferably from 150° to 250° F. for a period of time sufficient to obtain a dry film. Generally, this time will range from about 1 to 30 minutes, preferably from 10 to 20 minutes. The components present in a particular coating composition used will control the temperature and time that will be required to obtain an adequate cure and a good film coating.

The coatings compositions of this invention are high solids coatings compositions and they can contain as much as 100 weight percent solids therein. Generally the total solids content of the coatings compositions of this invention range from about 60 to 80 weight percent of the total weight of the composition.

The coatings compositions were evaluated according to the following procedures:

Solvent resistance is a measure of the resistance of the cured film to attack by acetone and is reported in the number of rubs or cycles of acetone soaked material required to remove one half of a film from the test area. The test is performed by stroking the film with an acetone soaked cheesecloth until that amount of film coating is removed. The number of cycles required to remove this amount of coating is a measure of the coating solvent resistance.

Reverse impact measures the ability of a given film to resist rupture from a falling weight. A Gardner Impact Tester using an 8-pound dart is used to test films cast and cured on steel panels. The dart is raised to a given height in inches and dropped onto the reverse side of a coated metal panel. The inches times pounds, designated inch-pound, absorbed by the film without rupturing is a measure of the films reverse-impact resistance.

In this application Silicone Surfactant I is:

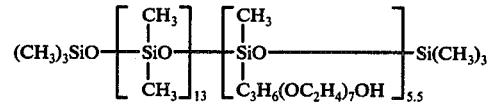

The following examples further serve to define this invention.

EXAMPLE 1

A reaction flask equipped with a stirrer, thermometer, dropping funnel, and nitrogen inlet tube was charged with 74 grams of 2-ethoxyethanol and 12 grams of isopropanol. The solution was heated to 110° C. and a mixture of 100 grams of 2-ethylhexyl acrylate, 100 grams of acrylic acid, 1 gram of dodecylmercaptan and 14 grams of tertiary-butyl perbenzoate contained in the dropping funnel was added dropwise over a 1-hour period. Then 1 gram of tertiary-butyl perbenzoate dissolved in 2-ethoxyethanol was added and the reaction mixture was heated for an additional 60 minutes at 120° C. The liquid low molecular weight acrylic acid copolymer, or oligomer, at 76% weight solids, had a Brookfield viscosity of 600 poises at 25° C.

A coating formulation was formulated by mixing 0.66 gram of the above oligomer with 9.5 grams of bis(3,4- epoxy-6-methylcyclohexylmethyl)adipate, 2 grams of 2-ethoxyethyl acetate, 0.05 gram of stannous octoate and 0.19 gram of Silicone Surfactant I. Films were cast on steel panels with a number 60 wire wound rod and cured for 20 minutes at 200° F. The cured films were flexible (about 50 inch-pounds reverse impact resistance), adherant, relatively hard (F pencil hardness), and resistant to acetone. The coatings were applied at 83 weight percent solids.

A second coating composition was formulated by mixing 3.95 grams of the above oligomer with 7.0 grams of bis(3,4-epoxy-6-methylcyclohexylmethyl)adipate, 0.05 grams of stannous octoate and 3 grams of methyl isobutyl ketone. Films were cast on steel panels with a number 60 wire wound rod and cured for 20 minutes at 200° F. The cured film was flexible (100 inch-pounds reverse impact resistance), adherent, hard (5H pencil hardness), and acetone resistant.

EXAMPLE 2

Following the procedure described in Example 1, a mixture of 74 grams of 2-ethoxyethanol and 12 grams of isopropanol was charged to a reactor. A mixture of 120 grams of acrylic acid, 80 grams of 2-ethylhexyl acrylate, 1 gram of dodecylmercaptan and 14 grams of tertiary-butyl perbenzoate was added dropwise to the reactor which was heated to 110° C. over a one-hour period. One gram of tertiary-butyl perbenzoate contained in 20 grams of 2-ethoxyethanol was added, and the reaction mixture was heated at 120° C. for an additional hour to produce a liquid low molecular weight acrylic acid copolymer, or oligomer. The copolymer contained 60% by weight of acrylic acid and 40% by weight of 2-ethylhexyl acrylate.

A coating composition was formulated by mixing 2.38 grams of the above oligomer with 8 grams of bis-(3,4-epoxy-6-methylcyclohexylmethyl)adipate, 0.5 gram of stannous octoate and 3 grams of methyl isobutyl ketone. Films were cast on steel panels with a number 60 wire wound rod and cured for 20 minutes at 200° F. and 10 minutes at 350° F. In both instances, the cured films were hard (3H pencil hardness), adherent, and acetone resistant. The film cured at the lower temperature was more flexible. The coating was applied at 75 weight percent solids.

EXAMPLE 3

A pigmented coating composition was produced by grinding a mixture of 29.68 grams of the oligomer produced in Example 1 with 127.5 grams of bis(3,4-epoxy-6-methylcyclohexylmethyl)adipate, 75 grams of titanium dioxide, 15 grams of 2-ethoxyethyl acetate, 1 gram of stannous octoate and 0.6 gram of Silicone Surfactant I. A 192.75 grams portion of this pigment grind was blended with 28 grams of 2-ethoxyethyl acetate to yield a coating composition having an 80 weight percent and a 72 volume percent solids content, and a Brookfield viscosity of 215 cps. This composition was spray coated on to steel panels and cured at 350° F. for 10 minutes and 200° F. for 30 minutes to yield a high gloss, adherent, and tough pigmented coatings. After 6 months exposure in Florida, this composition retained 94% of its original 60° gloss.

EXAMPLE 4

A pigmented coating composition was produced by grinding a mixture of 29.68 grams of the oligomer produced in Example 1 with 127.5 grams of bis(3,4-epoxycyclohexylmethyl)adipate, 75 grams of titanium dioxide, 15 grams of 2-ethoxyethyl acetate, 1 gram of stannous octoate and 0.06 gram of Silicone Surfactant I. A 181.45 grams portion of this pigment grind was blended with 22 grams of 2-ethoxyethyl acetate to yield a coating composition having an 82 weight percent and a 75 volume percent solids content, and a Brookfield viscosity of 205 cps. This composition was spray coated onto steel panels and cured at 200° F. for 20 minutes to yield a high gloss (20° gloss of 86), adherent, flexible (100 inch-pounds reverse impact resistance), and tough pigmented coating composition. After six-months exposure in Florida, this coating retained 94% of its initial gloss.

EXAMPLE 5

Following the procedure described in Example 1, a mixture of 74 grams of 2-ethoxyethanol and 12 grams of isopropanol was charged to a reactor. A mixture of 100 grams of butyl acrylate, 100 grams of acrylic acid, 1 gram of dodecylmercaptan and 14 grams of t-butyl perbenzoate was added dropwise to the reactor and heated to 110° C. over a 1-hour period. A mixture of 1 gram of t-butyl perbenzoate and 20 grams of 2-ethoxyethanol was added and the mixture was heated at 120° C. for an additional 60 minutes. The resulting mixture had a solids content of 82 weight percent and a Brookfield viscosity of 930 poises. The liquid low molecular weight acrylic acid copolymer oligomer had an acid number of 216 mg. KOH/gm.

A coating composition was produced by blending 1.83 grams of the above oligomer solution with 8.5 grams of bis(3,4-epoxy-6-methylcyclohexylmethyl)adipate, 0.05 gram of stannous octoate and 2 grams of methyl isobutyl ketone. The 81 weight percent solids formulation was coated on to steel panels with a number 60 wire wound rod and cured for 20 minutes at 200° F. The cured film was flexible (250 inch-pounds reverse impact resistance), adherent, hard (2H pencil hardness), and resistant to acetone solvent.

EXAMPLE 6

A coating formulation was produced by blending 11.90 grams of the oligomer solution produced in Example 5 with 5.63 grams of 3,4-epoxycyclohexylmethyl-3,4-epoxycyclohexane carboxylate, 0.7 gram of stannous octoate catalyst, 0.06 gram of Silicone Surfactant I and 9 grams of methyl isobutyl ketone. The 59 weight percent solids solution was applied to steel panels with a number 60 wire wound rod and cured for 20 minutes at 200° F. The cured films were hard (2H pencil hardness), adherent, acetone resistant, and had marginal flexibility (15 inch-pounds reverse impact resistance).

EXAMPLE 7

A reaction flask that was equipped with a stirrer, thermometer, nitrogen inlet tube, and dropping funnel was charged with 74 grams of 2-ethoxyethanol and 12 grams of isopropanol. The mixture was heated to reflux at 110° C. and a mixture of 120 grams of butyl acrylate, 40 grams of methyl methacrylate, 40 grams of acrylic acid, 1 gram of dodecylmercaptan and 14 grams of tertiary-butyl perbenzoate contained in the dropping funnel was added dropwise into the refluxing mixture. After adding the contents of the dropping funnel, a solution of 1 gram of t-butyl perbenzoate dissolved in 20 grams of 2-ethoxyethanol was added. The mixture was heated an additional 60 minutes at 120° C. The resultant liquid low molecular weight acrylic acid copolymer, or oligomer, had an acid number of 100 mg. KOH/gm. and a viscosity of 7300 cps as 80 weight percent solids that can be used to produce coating and ink compositions when formulated as described in Example 6.

EXAMPLE 8

A reaction flask equipped with a stirrer, thermometer, nitrogen inlet tube, and dropping funnel was charged with 74 grams of 2-ethoxyethanol and 12 grams of isopropanol. The mixture was heated to reflux at 110° C.; and 70 grams of butyl acrylate, 40 grams of styrene, 90 grams of acrylic acid, 1 gram of dodecylmercaptan, and 14 grams of tertiary-butyl perbenzoate contained in the dropping funnel were added dropwise into the refluxing mixture. After adding the contents of the dropping funnel, 1 gram of t-butyl perbenzoate dissolved in 20 grams of 2-ethoxyethanol was added. The mixture was heated an additional 60 minutes at 120° C. The resultant product had an acid number of 100 mg. KOH/gm. and a viscosity of >100,000 cps as 75 weight percent solids.

EXAMPLE 9

A coating formulation was produced by blending 11.2 grams of Example 8 oligomer solution with 12 grams of epoxidized soybean oil, 0.1 gram of stannous octoate, 0.04 gram of Silicone Surfactant I, and 5 grams of butyl acetate. The 72 weight percent solids solution was applied to steel panels with a number 60 wire wound rod and cured for 20 minutes at 200° F. The cured film was glossy and acetone resistant.

EXAMPLE 10

A coating formulation was produced by blending 12.56 grams of Example 7 oligomer solution with 2.25 grams of 3,4-epoxycyclohexylmethyl-3,4-epoxycyclohexane carboxylate, 0.07 gram of stannous octoate, 0.06 gram of Silicone Surfactant I, and 4 grams of methyl isobutyl ketone. The 66 weight percent solids solution was applied to steel panels with a number 60 wire wound rod and cured for 20 minutes at 200° F. The cured film was flexible (>320 inch-pounds reverse impact resistance), acetone resistant, adherent, and hard (pencil hardness of H).

EXAMPLE 11

A reaction flask equipped with a stirrer, thermometer, nitrogen inlet tube, and dropping funnel was charged with 86 grams of 2-ethoxyethyl acetate. The reactor was heated to 110° C. and 80 grams of hydroxypropyl acrylate, 120 grams of 2-ethylhexyl acrylate, 1 gram of dodecylmercaptan, and 14 grams of tertiary-butyl perbenzoate contained in the dropping funnel was added dropwise into the refluxing mixture. After adding the contents of the dropping funnel, 1 gram of t-butyl perbenzoate dissolved in 2-ethoxyethyl acetate was added. The mixture was heated for 1 hour at 125° C. The mixture was cooled to 70° C. and 55 grams of maleic anhydride were added. Then the mixture was heated at 130° C. for 30 minutes. The product was dark amber and had a Brookfield viscosity of 574 centipoises at 70% solids (No. 3 spindle, 100 rpm).

EXAMPLE 12

A coating formulation was produced by blending 7 grams of Example 11 oligomer solution (70% solids by weight) with 3 grams of 3,4-epoxycyclohexylmethyl-3,4-epoxycyclohexane carboxylate, and 0.1 gram of stannous octoate. The 79 weight percent solids coating was applied to steel panels with a number 40 wire wound rod and cured for 20 minutes at 200° F. The cured film was smooth (no silicone required), glossy, flexible (75 inch-pounds reverse impact resistance), and moderately hard (F pencil hardness).

What we claim is:

1. A high solids composition comprising (I) from 10 to 60 weight percent of a low molecular weight carboxylic-containing copolymer and (II) from 40 to 90 weight percent of an aliphatic polyepoxide, said percentages based on the combined weights of (I) and (II); and wherein said low molecular weight copolymer (I) has a molecular weight of from about 500 to about 10,000 and is the copolymer of (A) a monocarboxylic acid or dicarboxylic acid of the structure:

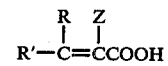

wherein Z is hydrogen or methyl or carboxymethyl; R is hydrogen or methyl and R' is hydrogen or carboxyl; and (B) from 30 to 80 weight percent of a polymerizable ethylenically unsaturated monomer whose polymers have a glass transition temperature below 0° C.

2. A high solids composition as claimed in claim 1, wherein said (I) is present at concentration of from 30 to 50 weight percent and said (II) is present at a concentration of from 50 to 70 weight percent.

3. A high solids composition as claimed in claim 1, wherein said (I) is the copolymer of acrylic acid and 2-ethylhexyl acrylate and said (II) is bis(3,4-epoxy-6-methylcyclohexylmethyl)adipate.

4. A high solids composition as claimed in claim 1, wherein said (I) is the copolymer of acrylic acid and butyl acrylate and said (II) is bis(3,4-epoxy-6-methylcyclohexylmethyl)adipate.

5. A high solids composition as claimed in claim 1, wherein said (I) is the copolymer of acrylic acid and butyl acrylate and said (II) is 3,4-epoxycyclohexylmethyl-3,4-epoxycyclohexane carboxylate.

6. A high solids composition as claimed in claim 1, wherein said (I) is the copolymer of acrylic acid, butyl acrylate and methyl methacrylate and said (II) is 3,4-epoxycyclohexylmethyl-3,4-epoxycyclohexane carboxylate.

7. The cured composition of claim 1.